(12) United States Patent
Fricanco et al.

(10) Patent No.: US 7,318,165 B2
(45) Date of Patent: Jan. 8, 2008

(54) APPARATUS FOR MANAGING A CACHE IN A DISTRIBUTED CACHING ENVIRONMENT HAVING AN EVENT AUDITOR AND A CACHE AUDITOR

(75) Inventors: Charles Philip Fricanco, Raleigh, NC (US); Brian Keith Martin, Cary, NC (US); Daniel Christopher Shupp, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 10/758,056

(22) Filed: Jan. 15, 2004

(65) Prior Publication Data

US 2005/0160303 A1 Jul. 21, 2005

(51) Int. Cl.
*G06F 1/12* (2006.01)
*G06F 12/00* (2006.01)
*H04L 7/00* (2006.01)

(52) U.S. Cl. ............... 713/400; 707/203; 375/356
(58) Field of Classification Search ............... 713/400, 713/375; 370/395.62; 375/356; 709/229; 707/203
See application file for complete search history.

(56) References Cited

U.S. PATENT DOCUMENTS

| | | | | |
|---|---|---|---|---|
| 4,021,784 A | | 5/1977 | Kimlinger ............ | 340/172.5 |
| 4,337,463 A | * | 6/1982 | Vangen ............... | 340/825.2 |
| 4,827,401 A | | 5/1989 | Hrustich et al. ........ | 364/200 |
| 5,909,689 A | * | 6/1999 | Van Ryzin ............ | 707/203 |
| 5,918,040 A | * | 6/1999 | Jarvis ................. | 713/375 |
| 5,970,107 A | * | 10/1999 | Bleiweiss et al. ...... | 370/395.62 |
| 6,170,013 B1 | * | 1/2001 | Murata ................ | 709/229 |
| 6,256,712 B1 | | 7/2001 | Challenger et al. ..... | 711/141 |
| 6,446,092 B1 | * | 9/2002 | Sutter ................. | 707/203 |
| 6,470,057 B1 | * | 10/2002 | Hui et al. ............. | 375/294 |
| 7,043,651 B2 | * | 5/2006 | Aweya et al. .......... | 713/400 |

FOREIGN PATENT DOCUMENTS

WO WO 99/40514 8/1999

OTHER PUBLICATIONS

Abali et al., "Clock Synchronization on a Multicomputer", Journal of Parallel and Distributed Computing, 40(1), 197, pp. 1-31.
Min et al., "Design and Analysis of a Scalable Cache Coherence Scheme Based on Clocks and Timestamps", IEEE Transactions on Parallel and Distributed Systems, vol. 3, No. 1, Jan. 1992, pp. 25-44.
IBM Research Disclosure, "Timestamp Method for Ensuring that Content Matches Notification in a Pull-Based Web Content Distribution System", Apr. 2002, pp. 702-703.
IBM Technical Disclosure Bulletin, "Dynamic Timer Algorithm for Caching Quota Information on OS/2 Distributed File System Client", vol. 37, No. 04B, Apr. 1994, pp. 467-469.
IBM Technical Disclosure Bulletin, "Technique for Parallel Trace-Driven Multiprocessor Cache Simulation with Write Invalidate", vol. 33, No. 3A, Aug. 1990, pp. 174-178.

* cited by examiner

*Primary Examiner*—Suresh K Suryawanshi
(74) *Attorney, Agent, or Firm*—Duke W. Yee; Martin McKinley; Gerald H. Glanzman

(57) ABSTRACT

A distributed cache management system that minimizes invalid cache notification events is provided. A cache management system in a sending device processes outgoing cache notification events by adding information about the source server's clock. A cache management system in the receiving device then uses this information to adjust event information once the event is received.

4 Claims, 4 Drawing Sheets

APPARATUS FOR MANAGING A CACHE IN A DISTRIBUTED CACHING ENVIRONMENT HAVING AN EVENT AUDITOR AND A CACHE AUDITOR

BACKGROUND OF THE INVENTION

1. Technical Field

The present invention relates to data processing systems and, in particular, to distributed caching environments. Still more particularly, the present invention provides a method, apparatus, and program for minimizing invalid cache notification events in a distributed caching environment.

2. Description of Related Art

Using two or more computer systems that work together is referred to as "clustering." Clustering generally refers to multiple servers that are linked together in order to handle variable workloads or to provide continued operation in the event one fails. Each computer may be a multiprocessor system itself. A cluster of servers provides fault tolerance and/or load balancing. If one server fails, one or more additional servers are still available. Load balancing distributes the workload over multiple systems.

A cache is used to speed up data transfer and may be either temporary or permanent. A server may cache information that is frequently accessed. Some content has a short lifespan. For example, many servers generate dynamic content, which is relevant for a short period of time. These cache entries are assigned a time to live (TTL), which is a time of expiration. Thus, a server must perform cache management to keep the cache entries fresh and relevant.

Often, servers in a cluster generate similar data. Therefore, a benefit exists for sharing cache information among clustered servers. In a distributed caching environment, notification events are passed between member servers to synchronize cache entries within the managed cluster's domain. These notification events are used to add or update information in remote caches or to invalidate current information in remote caches.

If the clocks in the member servers are not synchronized, an incoming event may be unexpectedly discarded. Discarded events can cause poor system-wide performance, because the expected cached information will not be found and must be regenerated. Data integrity problems can also occur due to server clock error by allowing cached objects to live longer than expected.

Typically, to solve this problems, customers attempt to have each server's clock synchronized either manually or through external methods. Add-on products that implement a time protocol, such as network time protocol (NTP) or digital time services (DTS), may also be used. However, in a heterogeneous network environment, these methods lack the product-embedded inter-enterprise solution. Tying the solution to the product isolates the distributed caching systems from the problems that arise when no external NTP or DTS external product is employed, enterprises use different external methods for synchronizing clocks, or additional caching nodes are inserted into the network from a new enterprise.

As an example of the problem in the prior art, consider a first server and a second server with synchronized clocks. A cache entry is created by the first server with a TTL of ten minutes. A cache notification event is sent from the first server to the second server. The second server will receive the cache notification event and create the cache entry with a correct TTL.

However, consider an instance where the clock of the first server is four minutes ahead of the clock of the second server. The second server will receive the cache notification event and create the cache entry; however, the cache entry will have only six minutes to live. Thus, the event will be discarded prematurely. This will result in poor system performance, because data must be regenerated sooner than expected.

Now, consider an instance where the clock of the first server is four minutes behind the clock of the second server. In this case, the event will live longer than expected in the second server. This will result in data integrity problems, because data may live longer than the relevancy of the data.

SUMMARY OF THE INVENTION

The present invention recognizes the disadvantages of the prior art and provides a distributed cache management system that minimizes invalid cache notification events. A cache management system in a sending device processes outgoing cache notification events by adding information about the source server's clock. A cache management system in the receiving device then uses this information to adjust event information once the event is received.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
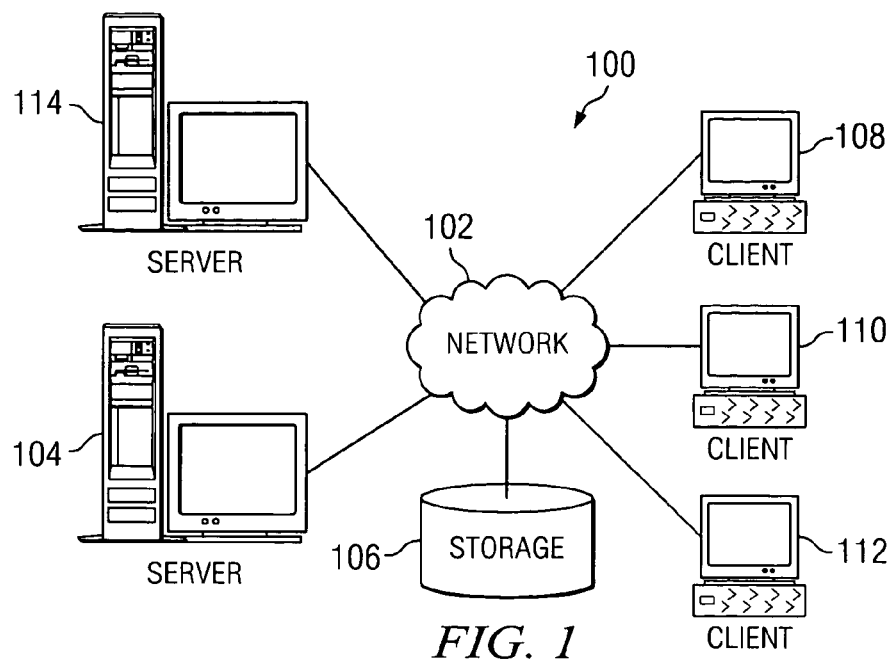
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104, 114 are connected to network 102 along with storage unit 106. In addition, clients 108, 110, and 112 are connected to network 102. These clients 108, 110, and 112 may be, for example, personal computers or network computers. In the depicted example, servers 104 and 114 provide data, such as boot files, operating system images, and applications to clients 108-112. Clients 108, 110, and 112 are clients to server 104. Network data processing system 100 may include additional servers, clients, and other devices not shown.

In accordance with an exemplary embodiment of the present invention, servers 104, 114 shared cache information in a distributed caching environment. The servers pass notification events between them to synchronize cache entries. These notification events are used to add or update information in the server caches or to invalidate current information in a server's cache.

If the clocks in the servers are not synchronized, an incoming event may be unexpectedly discarded. Discarded events can cause poor system-wide performance, because the expected cached information will not be found and must be regenerated. Data integrity problems can also occur due to server clock error by allowing cached objects to live longer than expected. The window of opportunity for discarding these events is based on a difference in the clocks of the servers.

Thus, in accordance with a preferred embodiment of the present invention a distributed cache management system is provided that minimizes invalid cache notification events. A cache management system in a sending server processes outgoing cache notification events by adding information about the source server's clock. A cache management system in the receiving server then uses this information to adjust event information once the event is received.

The distributed cache management system of the present invention reduces the window of opportunity for failure down to the network transport time (NTT), which is usually in the millisecond range. Because the TTL is usually much greater than the millisecond transport time, the distributed cache management system of the present invention virtually eliminates the problems caused by server clock differences.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
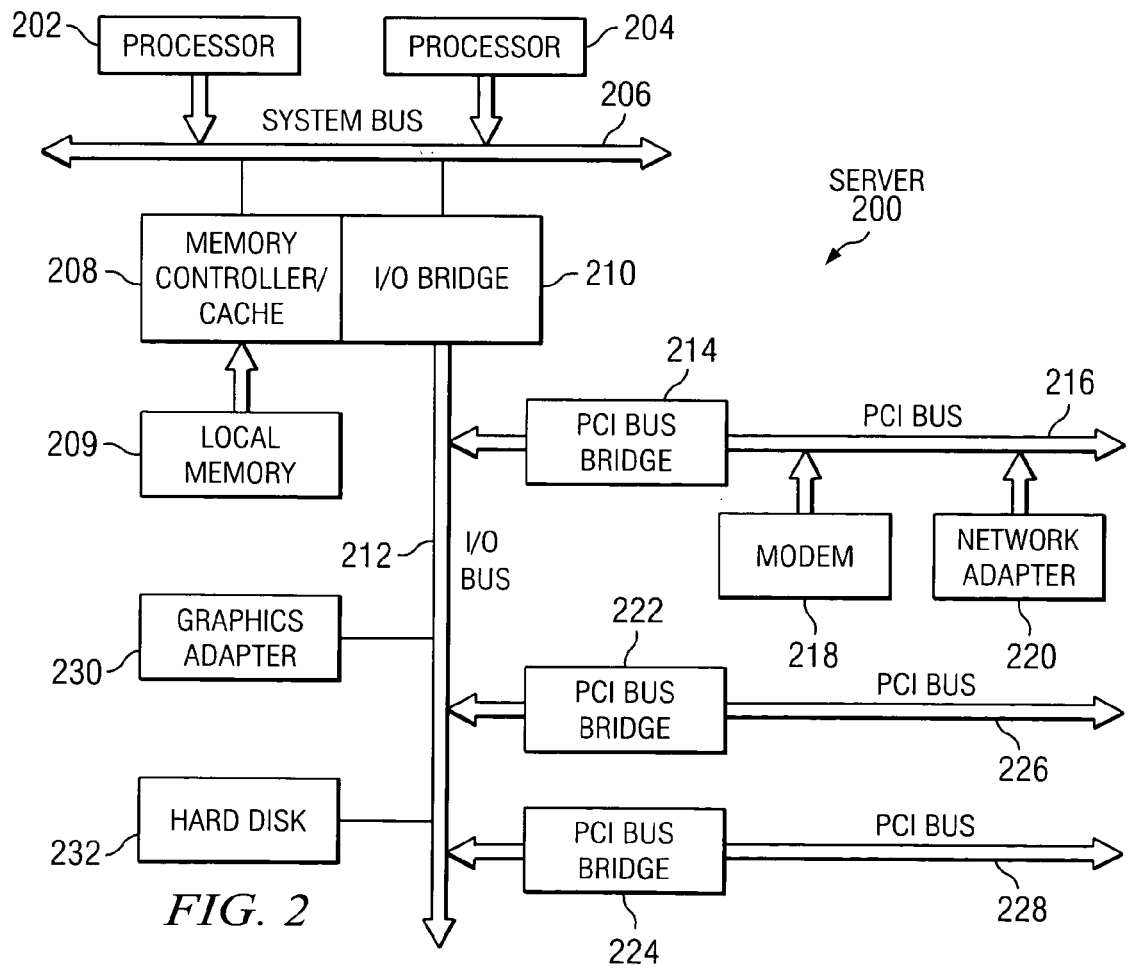
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system. Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
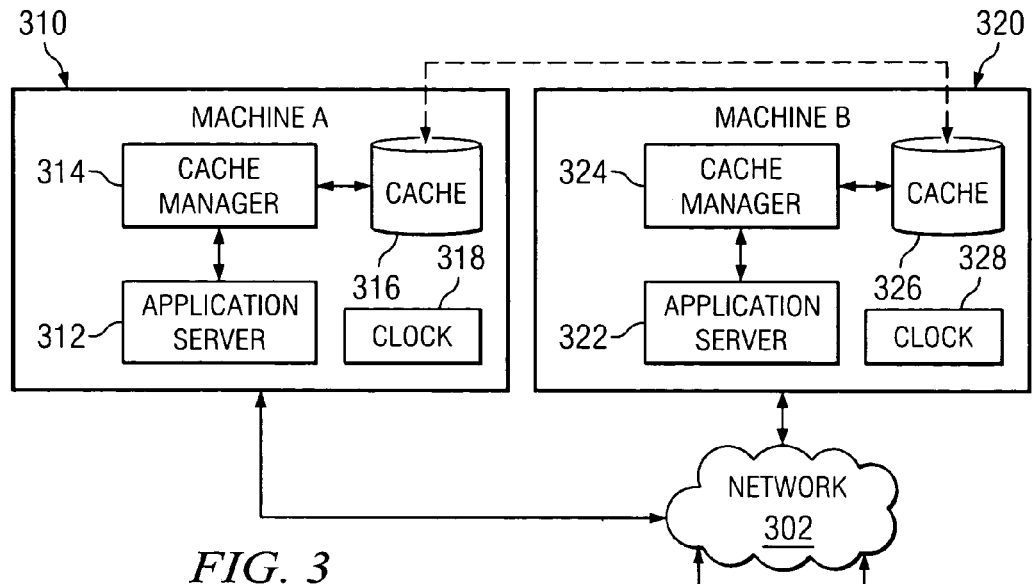
FIG. 3 is a block diagram illustrating an exemplary distributed caching environment in accordance with a preferred embodiment of the present invention.

FIG. 3 is a block diagram illustrating an exemplary distributed caching environment in accordance with a preferred embodiment of the present invention. Machine A 310 and Machine B 320 are connected to network 302, along with user 1 304 and user 2 306. Machine A includes application server 312, cache manager 314, and cache storage 316. Similarly, machine B includes application server 322, cache manager 324, and cache storage 326.

When a user, such as user 1 304, access information in machine A, the application server may generate or retrieve information and return the information to the user. For example, application server 312 may be a Web server that generates dynamic content. The application server 312 may then store the information in cache 316 through cache manager 314.

Machine A and machine B may send cache notification events between them to synchronize cache 316 and cache 326. Thus, when application server 312 stores information in cache 316, cache manager 314 may generate a cache notification event and send this event to cache manager 324 for storage in cache 326. For example, a cache entry may be added to a cache. When content is dynamically created or otherwise time-sensitive, a cache entry may be given an expiration or time to live (TTL). This expiration may be a discrete time or an amount of time relative to the created time.

Subsequently, a user, such as user 2 306, may request the same information from machine B 320. Cache manager 324 may find this information in cache 326 and provide the cached information to application server 322, rather than having the application server generate the information again.

Machine A 310 has a clock 318 and machine B 320 has a clock 328. If the clocks in the servers are not synchronized, the cache notification event may be unexpectedly discarded from cache 326 or allowed to live too long in cache 326.

Discarded events can cause poor system-wide performance, because the expected cached information will not be found and must be regenerated. Data integrity problems can also occur due to server clock error by allowing cached objects to live longer than expected.

In accordance with a preferred embodiment of the present invention, the cache manager of the sending machine processes outgoing cache notification events by adding information about the source server's clock. Therefore, when cache manager 314 sends a cache notification event to cache manager 324, it adds information about clock 318 to the event.

A cache management system in the receiving server then uses this information to adjust event information once the event is received. Thus, when cache manager 324 receives a cache notification event from cache manager 314, it compares the clock information in the event to the local clock, clock 328. The receiving cache manager then determines a clock delta. The receiving cache manager may then adjust the event, such as, for example, adjusting the TTL of the cache entry, based on the clock delta.

Figure 4:
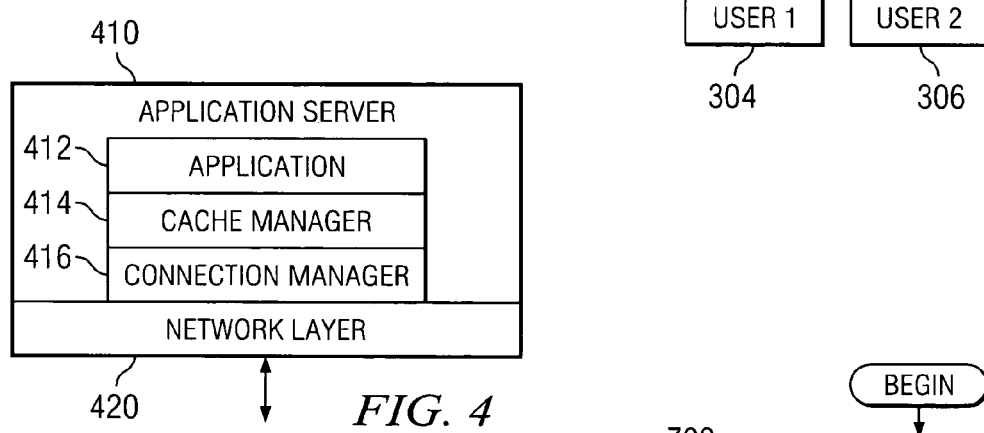
FIG. 4 is a block diagram illustrating a software structure of a computing device in accordance with an exemplary embodiment of the present invention.

FIG. 4 is a block diagram illustrating a software structure of a computing device in accordance with an exemplary embodiment of the present invention. A computing device, such as a server, may include an application server 410, for providing information to clients, and a network layer 420, for communicating with other devices in a network data processing system.

Application server 410 includes application software 412, cache manager 414, and connection manager 416. The application software retrieves or generates data responsive to user requests. The cache manager stores and retrieves information in a cache storage and communicates with other cache managers in the distributed caching environment.

In an alternative embodiment, connection manager 416 may be a separate layer or part of network layer 420. Cache manager 414 may also be a separate layer. In an exemplary embodiment, the present invention may be embodied within the cache manager or, alternatively, within the connection manager.

Figure 5A:
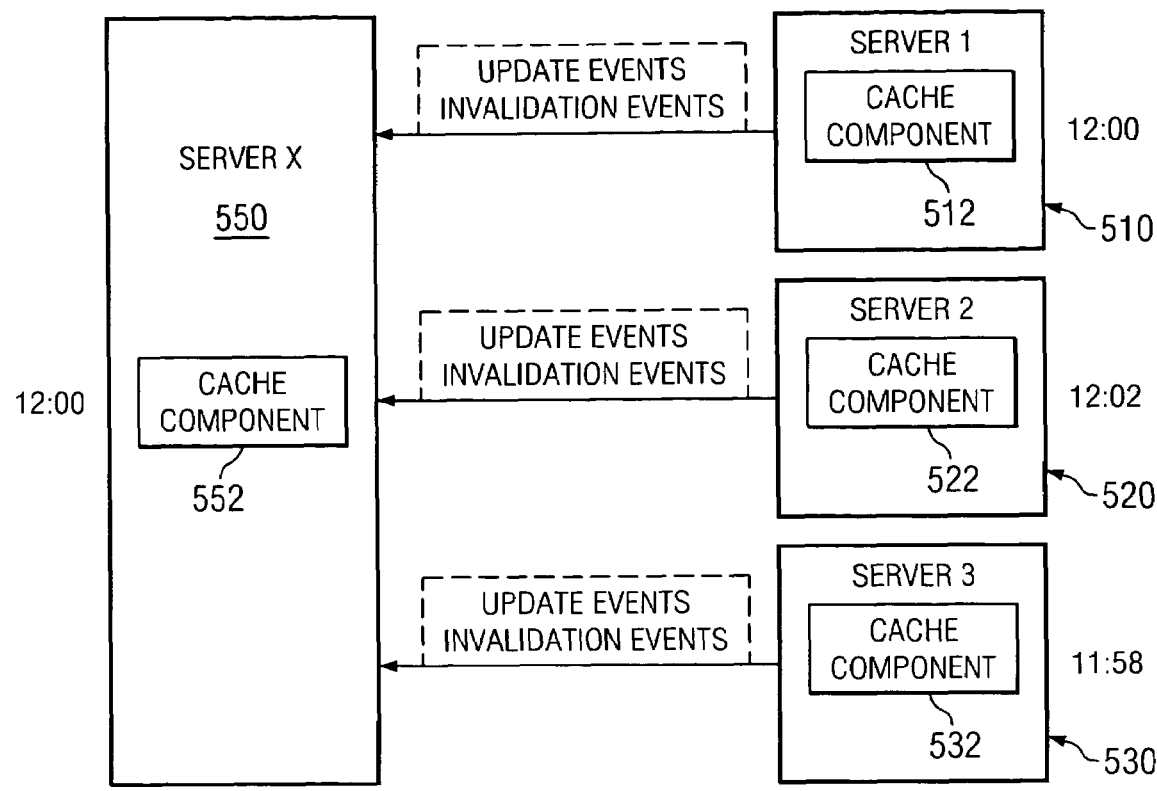
FIGS. 5A-5C illustrate example cache invalidation and update operations in accordance with a preferred embodiment of the present invention.
Figure 5B:
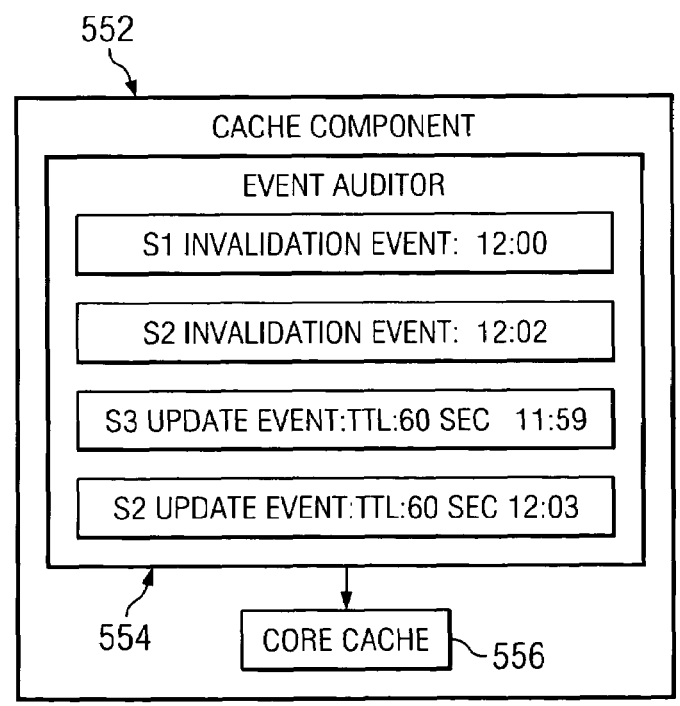
Figure 5C:
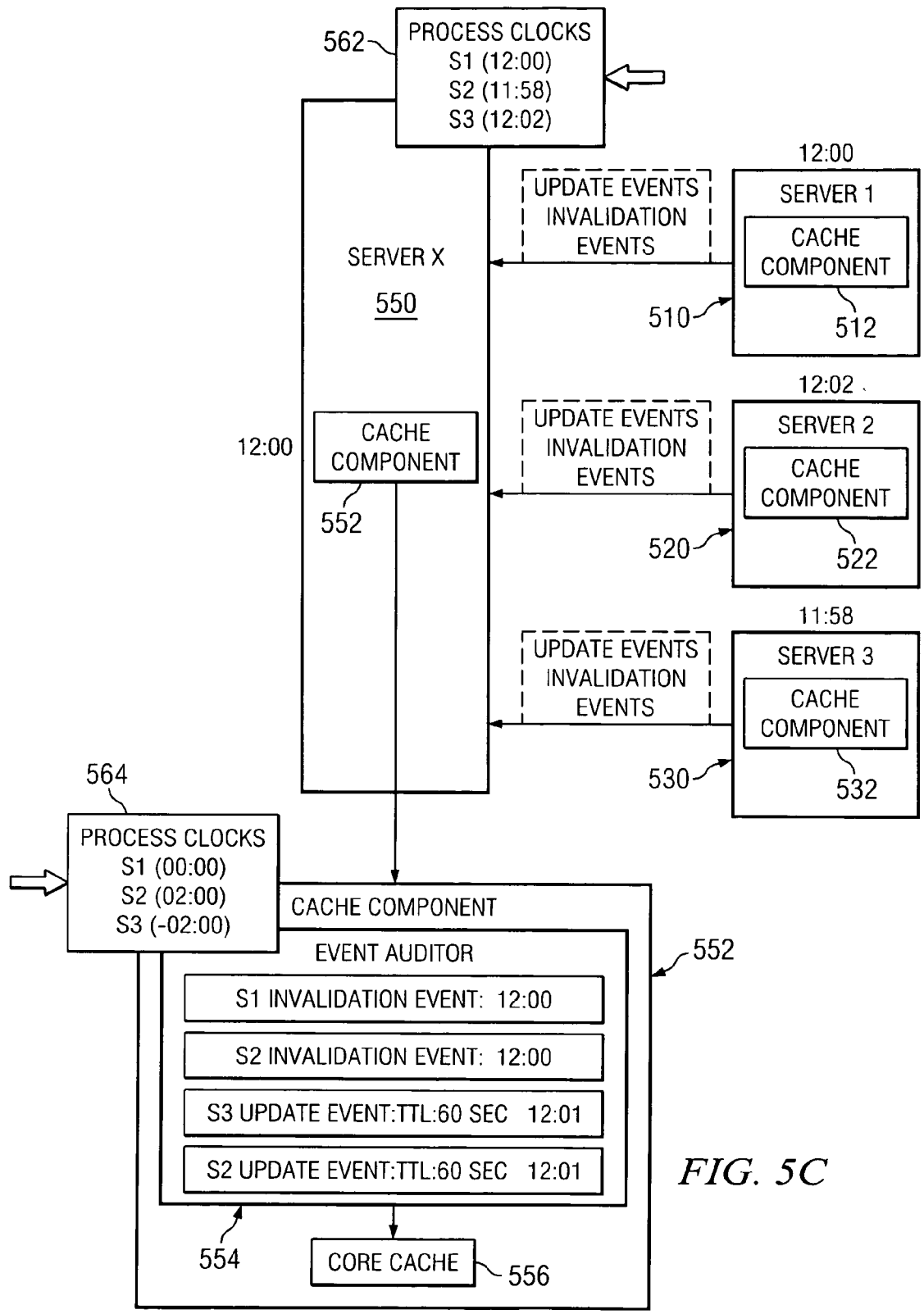

FIGS. 5A-5C illustrate example cache invalidation and update operations in accordance with a preferred embodiment of the present invention. Server 1 510 includes cache component 512; server 2 520 includes cache component 522; and, server 3 530 includes cache component 532. Server 1, server 2, and server 3 send update events and invalidation events to server X 550, which includes cache component 552.

In the depicted example, the clocks of the servers are not synchronized. For example the server X clock is at 12:00 and the server 1 clock is set at 12:00; however, the server 2 clock is set at 12:02 and the server 3 clock is set at 11:58. Therefore, incoming events at server X 550 may be unexpectedly discarded or allowed to live too long.

FIG. 5B is a block diagram illustrating cache component 552. Event auditor 554 receives an invalidation event from server 1 which invalidates a cache entry, an invalidation event from server 2 which invalidates the same cache entry, an update event from server 3 which updates a cache entry with a TTL of 60 seconds, and an update event from server 2 which updates a cache entry with a TTL of 60 seconds. The cache notification events, as shown in event auditor 554, also include the server clock values (timestamps) indicating the time the events were generated. Cache component 552 also includes core cache 556.

The cache auditor validates the cache notification event to determine if the event should be honored or discarded. The validation may be an isolated or non-isolated validation. As seen in FIG. 5A, the clocks of the servers are not synchronized; therefore, the invalidation and update events may result in performance issues or data integrity problems.

Turning now to FIG. 5C, the cache manager of server X processes the clocks 562 from the update events and invalidation events received from server 1, server 2, and server 3, and generates clock deltas 564 for the servers. Cache auditor 552 then adjusts the timestamps in the cache notification events and performs the validation as discussed above. The auditor may then make a correct decision because the notification events have been time corrected.

Figure 6:
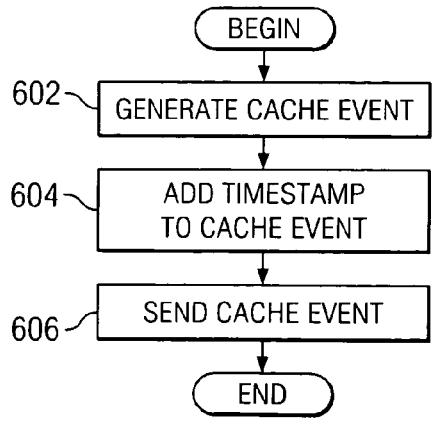
FIG. 6 is a flowchart illustrating the operation of a cache manager in a sending device in accordance with a preferred embodiment of the present invention.

FIG. 6 is a flowchart illustrating the operation of a cache manager in a sending device in accordance with a preferred embodiment of the present invention. The process begins and generates a cache event (step 602). The process then adds a timestamp to the cache event (step 604) and sends the cache event to the receiving device or devices (step 606). Thereafter, the process ends.

Figure 7:
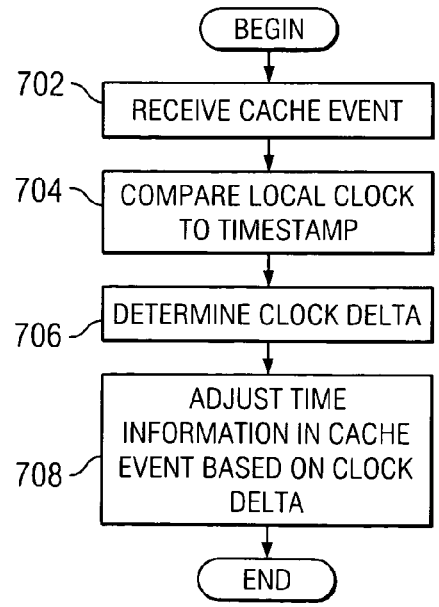
FIG. 7 is a flowchart illustrating the operation of a cache manager in a receiving device in accordance with a preferred embodiment of the present invention.

FIG. 7 is a flowchart illustrating the operation of a cache manager in a receiving device in accordance with a preferred embodiment of the present invention. The process begins and receives a cache event (step 702). The process compares a local clock to the timestamp (step 704) and determines a clock delta (step 706). Then, the process adjusts time information in the cache event based on the clock delta (step 708) and ends.

The present invention may also apply to other time-sensitive information in addition to cache information. For example, servers in a cluster may send status information for balancing workloads or for fault tolerance. In any instance where time sensitive information is passed among connected devices, the techniques of the present invention may be used to adjust time information to prevent problems that result from clocks that are not synchronized.

Thus, the present invention solves the disadvantages of the prior art by providing a distributed cache management system that minimizes invalid cache notification events. A cache management system in a sending device processes outgoing cache notification events by adding information about the source server's clock. A cache management system in the receiving device then uses this information to adjust event information once the event is received. The distributed cache management system of the present invention does not depend on the particular system clock. Furthermore, the present invention frees a distributed caching product from mandating an external time source.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for managing a cache in a distributed caching environment, the apparatus comprising:
    an event auditor for receiving a cache notification event from a sending device, wherein the cache notification event includes time relative information and a clock value for the sending device indicating a time the cache notification event was generated; and
    a cache auditor for making a validation decision to one of validate and discard the cache notification event received by the event auditor, wherein the cache auditor determines a clock delta by determining a difference between a local clock value and the clock value for the sending device, adjusts the time relative information in the cache notification event based upon the clock delta to time correct the cache notification event, and makes the validation decision to one of validate and discard the cache notification event based on the time corrected cache notification event.

2. The apparatus of claim 1, wherein the cache notification event is one of an add event, an update event, and an invalidation event.

3. The apparatus of claim 1, wherein the time relative information is an expiration value.

4. The apparatus of claim 3, wherein the expiration value is one of a discrete time and an amount of time relative to a created time.

* * * * *